Patented Apr. 19, 1932

1,854,252

UNITED STATES PATENT OFFICE

ABRAHAM L. FREEDLANDER, OF DAYTON, OHIO, ASSIGNOR TO THE DAYTON RUBBER MANUFACTURING COMPANY, OF DAYTON, OHIO, A CORPORATION OF OHIO

LUBRICATED BELT

No Drawing.  Application filed August 5, 1929. Serial No. 383,756.

My invention relates to a lubricated belt.

It is the object of my invention to provide a belt that will be noiseless.

Heretofore, rubber belts or combined rubber and fabric belts due to varying conditions of temperature, friction, humidity and other conditions have set up noises, such as squeaking, that make them highly undesirable for installation where quiet drives are essential.

It is the object of my invention to provide a cheap, permanent and effective means of rendering such belts permanently noiseless.

My invention consists in imparting to any rubber compound or combined rubber and fabric compound after vulcanization stearic acid or zinc stearate which is lightly sprinkled on the surface of the belt. The belt is then subjected to a temperature of 280° to 300° for one minute. It is then withdrawn and preferably allowed to cool and then subjected to the same treatment again where necessary. Usually two or three successive treatments are sufficient to render the belt permanently noiseless.

For instance, I employ a belt composed of 70% rubber, 4% sulphur, ½% accelerator and 25½% zinc oxide, vulcanizing either with or without suitable fabric and cord to make the usual belt. Then the stearic acid or zinc stearate is applied as explained above.

It will be understood that I desire to comprehend within my invention and within the scope of my claims such modifications as may be fairly comprehended within such claims and invention due to necessary modifications to adapt my invention to varying conditions of use and to varying purposes.

Having thus fully described my invention, what I claim as new and desire to secure by Letters Patent, is:

1. In combination, vulcanized rubber and zinc stearate applied after vulcanization.

2. In combination, a vulcanized rubber compound and zinc stearate applied at room temperature to the vulcanized rubber.

3. In combination, vulcanized rubber and fabric and zinc stearate applied at room temperature to the vulcanized rubber.

4. In combination, vulcanized rubber 70%, sulphur 4%, accelerator ½%, zinc oxide 25½% and stearic acid applied to the vulcanized rubber at room temperature.

5. In combination, vulcanized rubber 70%, sulphur 4%, accelerator ½%, zinc oxide 25½%, zinc stearate at room temperature and fabric vulcanized in said rubber.

6. In a process of rendering a belt noiseless, applying zinc stearate to the vulcanized belt surface at room temperature and subjecting the combination to heat.

7. In a process of rendering a vulcanized rubber driving member noiseless, applying zinc stearate and driving said material into the rubber under a temperature above room temperature.

8. In a process of rendering vulcanized rubber noiseless, applying a lubricant to the vulcanized rubber and heating the rubber to drive the lubricant therein.

9. In a process of rendering vulcanized rubber and fabric compounds noiseless, applying zinc stearate to the surface thereof and heating to drive the stearic compound into the vulcanized rubber and fabric.

10. In a process of rendering rubber and fabric compounds noiseless, applying zinc stearate to the surface thereof and heating for about one minute to drive the stearic compound into the rubber and fabric, said heat being carried to approximately 280° to 300°.

11. In a process of rendering rubber and fabric compounds noiseless, applying zinc stearate to the surface thereof and heating to drive the stearic compound into the rubber and fabric, said heat being carried to approximately 280° to 300° for approximately one minute at a time for a plurality of times.

12. In a process of rendering a rubber fabric compound noiseless, vulcanizing rubber, sulphur, an accelerator, a filler and a fabric together, sprinkling zinc stearate on the finished product and heating to approximately 280° to 300° for about one minute.

13. In a process, vulcanizing a belt of rubber, cooling, applying a mechanical lubricant, and heating to drive the lubricant into the belt.

14. In a process of producing a belt, forming a belt structure of unvulcanized rubber, applying heat thereto, whereby the rubber is vulcanized, cooling the belt, applying a lubricant to the belt and applying heat to drive the lubricant into the belt.

15. In a process of producing a lubricated belt, forming a belt structure of unvulcanized rubber, applying heat thereto to vulcanize the rubber, cooling the belt, applying to the surface of the belt a lubricating material, and heating the belt with the lubricating material thereon to drive the lubricating material into the belt.

In testimony whereof I affix my signature.

ABRAHAM L. FREEDLANDER.